2,855,377
POLYAMIDE ARTICLES INCORPORATING MOLYBDENUM DISULPHIDE

Louis L. Stott, Reading, Pa., assignor to The Polymer Corporation, Reading, Pa., a corporation of Pennsylvania No Drawing. Application July 24, 1953
Serial No. 370,222

8 Claims. (Cl. 260—37)

This invention relates to articles formed of high melting point polyamides, such as polyhexamethylene adipamide, polyhexamethylene sebacamide and polymerized epsilon aminocaproic acid (caprolactam), such high melting polyamides commonly being known as nylon. The invention is particularly concerned with machine parts or the like made of nylon, especially parts which are subject to heating in use, for instance as a result of friction. Typical examples are bearings, gears, rollers, cams, etc.

Although the high melting polyamides, and especially polyhexamethylene adipamide, have excellent frictional properties, the coefficient of thermal expansion of these materials is relatively high. Thus, in the case of polyhexamethylene adipamide, the coefficient of thermal expansion approximates ten times that of steel. Because of this, many bearings, gears and other machine parts made of nylon must be machined to dimensions providing excessively great clearances, in order to avoid binding or seizing when the parts become heated in use.

The invention is concerned with the incorporation of molybdenum disulphide in the nylon, the molybdenum disulphide being present in fine particle form dispersed throughout the material. The result of this incorporation of molybdenum disulphide is to markedly decrease the coefficient of thermal expansion, which is an important factor for machine parts. The molybdenum disulphide addition accomplishes the foregoing without appreciably impairing the desirable frictional or wear resisting characteristics of the nylon. Indeed, in some cases the coefficient of friction is even lowered, which is of importance in the operation of machine parts. Another important advantages is that the foregoing is accomplished without appreciable sacrifice of machinability.

The nylon materials to which the invention is applicable principally comprise the three high melting polyamides above mentioned (polyhexamethylene adipamide, polyhexamethylene sebacamide and polymerized epsilon aminocaproic acid), although the invention is of especial use with the adipamide, since this material is particularly well suited to the fabrication of a wide variety of machine parts subject to friction and therefore to thermal expansion. The nylon material may be modified somewhat by the presence of small quantities of certain other constituents, so long as the material consists essentially of nylon, and provided the modifiers are not of such character or present in such amounts as to completely destroy the improved characteristics imparted by the molybdenum disulphide. For example, fillers, for instance graphite, may be added, and other modifiers, antioxidants or the like added for other purposes. Various of these addition materials have been employed for a variety of purposes and when used, are present in quantities ranging up to about 2%.

The molybdenum disulphide may be incorporated in the nylon in powder or fine particle form, as by tumbling flake or granular nylon with the disulphide powder. The molybdenum disulphide may alternatively be incorporated by mechanically mixing the flake or granular nylon with a dispersion of the disulphide, after which the mixed materials may be dried. In either event, after incorporation of the molybdenum disulphide, the nylon material may thereafter be melted and pieces or articles formed therefrom either by pressure molding, by extrusion, by casting or by any other desired technique. Machine parts may be directly formed by these techniques, but in some cases the machine parts to be formed are machined or cut from rod, slab or cylindrical stock formed by any of the operations just mentioned.

The machining operations can be carried out substantially in the same manner as in the machining of the high melting polyamides not incorporating molybdenum disulphide, since the disulphide does not appreciably impair the machinability. In fact, the excellent machinability of nylon containing this ingredient is an important feature of the invention.

The quantity of molybdenum disulphide used, although varying somewhat depending upon the purposes and the nylon being used, should be from about 0.25% to about 4% or 5%. When using polyhexamethylene adipamide and caprolactam, molybdenum disulphide from about 1.50% to about 2.50% is found to be suitable for most purposes. When utilizing molydenum disulphide with polyhexamethylene sebacamide, the preferred quantity is from about 0.25% to about 2%.

The machine parts made from polyhexamethylene adipamide, according to the foregoing procedure, containing for example 2% molybdenum disulphide have a coefficient of thermal expansion (linear) of about $4 \times 10^{-5}$ per °C., which compares with a corresponding coefficient for polyhexamethylene adipamide without the molybdenum disulphide addition of about $6.1 \times 10^{-5}$ per °C. Even very small quantities of the molybdenum disulphide result in a noticeable decrease in the coefficient of thermal expansion, but additions beyond about 5% tend to cause brittleness and also tend to impair machinability. Moreover, large percentages are very difficult to uniformly disperse in the nylon.

The machine parts made from polyhexamethylene sebacamide, containing for example 0.5% molybdenum disulphide have a coefficient of thermal expansion (linear) of about $4.5 \times 10^{-5}$ per °C., which compares with a corresponding coefficient for polyhexamethylene sebacamide without the molybdenum disulphide addition of about $9.8 \times 10^{-5}$ per °C.

The machine parts made from polymerized epsilon aminocaproic acid (caprolactam), containing for example 2% molybdenum disulphide have a coefficient of thermal expansion (linear) of about $4.4 \times 10^{-5}$ per °C., which compares with a corresponding coefficient for polymerized epsilon aminocaproic acid without the molybdenum disulphide addition of about $7.6 \times 10^{-5}$ per °C.

This application is a continuation-in-part of my copending application Serial No. 199,568, filed December 6, 1950, now abandoned.

I claim:

1. A machine part made of a high melting polyamide selected from the class consisting of polyhexamethylene adipamide, polyhexamethylene sebacamide and polymerized epsilon aminocaproic acid, and incorporating from 0.25% to 4.00% by weight of molybdenum disulphide calculated on the weight of the polyamide, the molybdenum disulphide being present in fine particle form dispersed throughout the polyamide.

2. A machine part according to claim 1 in which the polyamide is polyhexamethylene adipamide and in which the percentage of molybdenum disulphide is from about 1.50% to about 2.50%.

3. A machine part according to claim 1 in which the polyamide is polyhexamethylene sebacamide and in which the percentage of molybdenum disulphide is from about 0.25% to about 2%.

4. A machine part according to claim 1 which the polyamide is polymerized epsilon aminocaproic acid and in which the percentage of molybdenum disulphide is from about 1.50% to about 2.50%.

5. A composition for use in the molding of machine parts, comprising particles of a high melting polyamide selected from the class consisting of polyhexamethylene adipamide, polyhexamethylene sebacamide and polymerized epsilon aminocaproic acid, said polyamide particles being intermixed with molybdenum disulphide in fine particle form, the molybdenum disulphide comprising from 0.25% to 4.00% by weight of the polyamide.

6. A composition according to claim 5 in which the polyamide is polyhexamethylene adipamide and in which the percentage of molybdenum disulphide is from about 1.50% to about 2.50%.

7. A composition according to claim 5 in which the polyamide is polyhexamethylene sebacamide and in which the percentage of molybdenum disulphide is from about 0.25% to about 2%.

8. A composition according to claim 5 in which the polyamide is polymerized epsilon aminocaproic acid and in which the percentage of molybdenum disulphide is from about 1.50% to about 2.50%.

References Cited in the file of this patent

UNITED STATES PATENTS 2,686,155      Willis et al. _____ Aug. 10, 1954

OTHER REFERENCES

Bowden et al.: Research (London), volume 3, pages 384–385 (August 1950).